UNITED STATES PATENT OFFICE.

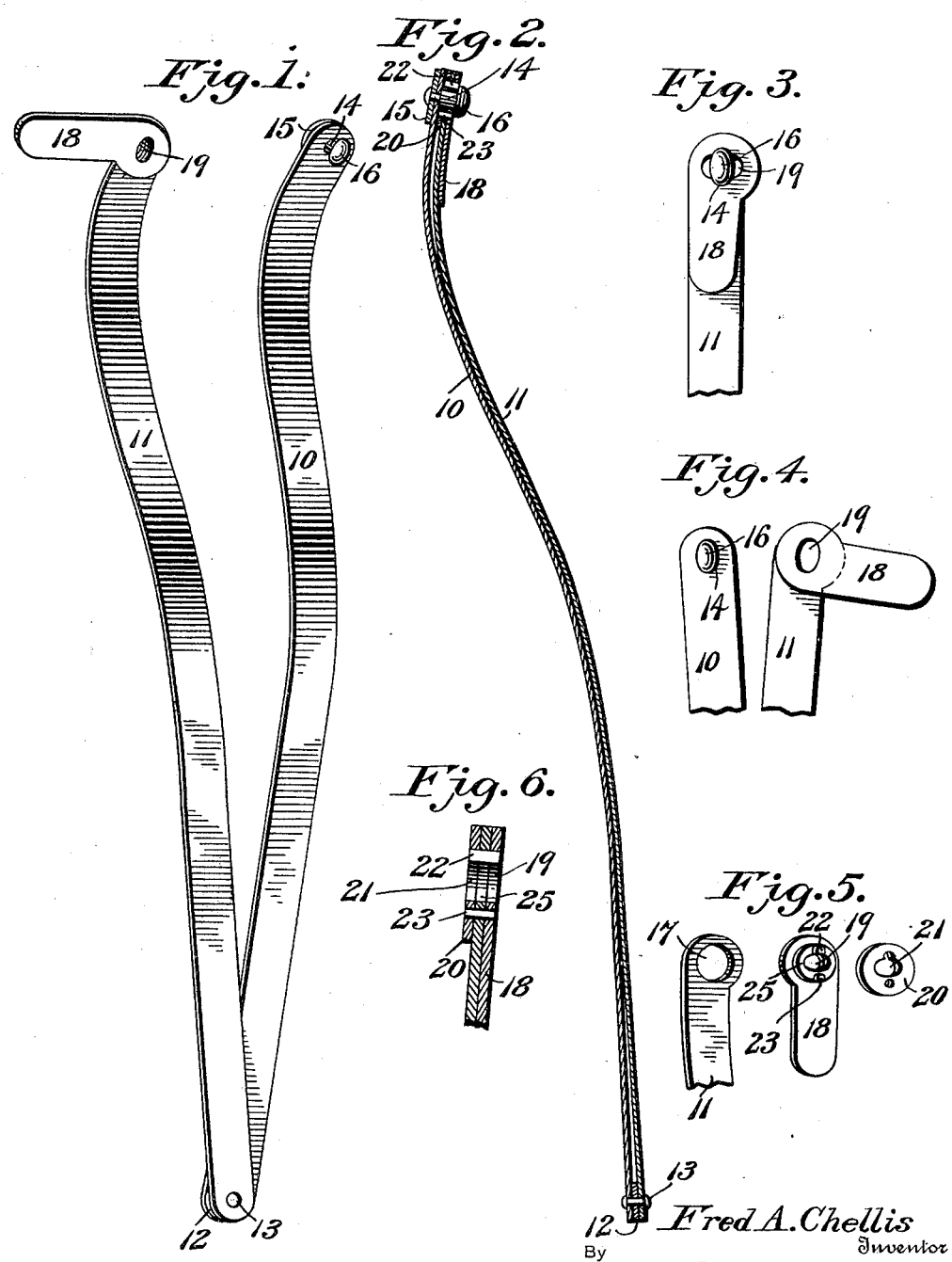

FRED A. CHELLIS, OF PORTLAND, MAINE, ASSIGNOR OF ONE-HALF TO CLINTON J. STONE, OF SAME PLACE.

PLACKET-FASTENER.

SPECIFICATION forming part of Letters Patent No. 673,759, dated May 7, 1901.

Application filed March 16, 1900. Serial No. 8,967. (No model.)

*To all whom it may concern:*

Be it known that I, FRED A. CHELLIS, a citizen of the United States, residing at Portland, in the county of Cumberland and State of Maine, have invented a new and useful Placket-Fastener, of which the following is a specification.

My invention relates to improvements in skirt-placket fasteners, and one object in view is to provide a simple and cheap contrivance which may be easily applied to a skirt in a position to be entirely concealed from view and which will securely hold the placket in a closed condition, because the edges thereof are brought into overlapping relation and the fastener is itself locked in place.

A further object is to provide an improved locking device capable of easy and quick manipulation to release or confine the fastener members, such locking device serving to securely hold the fastener in its closed condition and against any tendency to become separated accidentally.

Other objects and advantages of the invention will appear in the course of the subjoined description, and the novel features of construction and the combinations of parts will be defined in the claims.

In the drawings, Figure 1 is a perspective view of a placket-fastener embodying my invention and showing the same in its open condition. Fig. 2 is a sectional view taken longitudinally through the fastener when the members thereof are closed and held together by a locking device of my invention. Fig. 3 is an enlarged view in elevation showing the upper portions of the fastener members in their closed relation and with the locking device adjusted in position to restrain the members from separation. Fig. 4 is a view similar to Fig. 3, but showing the members separated and the locking device adjusted to a position which permits of such separation. Fig. 5 is a detail view in perspective of the parts forming the lock. Fig. 6 is a detail cross-section, on an enlarged scale, through the eye-formed end of one fastener member to show the means for loosely connecting the locking-plate thereto.
The same numerals of reference are used to indicate like and corresponding parts in each of the several figures of the drawings.

The placket-fastener of my invention consists of the strips or parallel members 10 11, between which is interposed a washer 12, the latter arranged at the pivotal end of the members and serving to space them a slight distance apart, thus accommodating the fabric of the skirt and providing for the members to be brought into overlapping relation. The pivotal pin 13 passes through the members at one end of the same and through the interposed washer, whereby the members may be opened in the form of a V to any desired extent, and provision is made for bringing the members when closed into overlapping relation. These members may consist of flat strips of material of any suitable character, such, for example, as metal, whalebone, and the like; but I prefer to employ metal in the construction of the fastener, because metallic members are capable of a certain amount of permanent elasticity, and they can be bent or curved to the desired configuration. I prefer to give each member the curved shape shown by the drawings, because the placket-fastener is made to conform to the figure of the wearer, so as to secure proper fitting of the skirt, which is very desirable, and at the same time the elasticity or flexibility of the fastener enables the same to give to the movements of the wearer, particularly when sitting down.

One of the fastener members, preferably the underlying member 10, is provided at the end opposite the pivot with a headed stud 14. A reinforcement 15 is applied against the rear side of the member 10, and through this member and the reinforcement is passed one end of the stud, the latter being upset or headed to secure it firmly in place. It is evident, however, that the stud may be attached to the member in any other secure way. The stud is rectangular or elliptical in cross-section, so that it is wider in one direction than in the other, and said stud is provided with a rounded or elliptical head 16, the major axis of which is at right angles to the minor axis thereof, said stud being secured centrally to the member 10 for the major axis of its elongated head to lie in the direction of the longitudinal axis of the member 10. The other member 11 of the fastener is provided with an eye 17, which is preferably of circular form and is arranged in a position to receive the headed stud of the member 10 when the two members are closed and brought into overlapping relation.

One of the important features of my improved placket-fastener is a locking-plate 18, loosely connected to the eye-formed member 11, so as to turn freely thereon, said locking-plate being provided with an elliptical or elongated eye 19, which registers at all times with the eye of the member 11, and is also adapted to receive the headed stud 14. The locking-plate has its elongated eye formed therein, so as to bring the major axis of said eye at right angles to the longitudinal axis of the plate, and as this plate is loosely connected to the eye-formed member 11 said plate can be turned to a position at right angles to the member 11 in order to bring the elongated eye 19 into position for the headed stud to pass through the alined eyes 17 19 of the member 11 and the plate 18. After the parts shall have been thus brought into engagement the locking-plate may be turned to a position parallel with the overlapping members for the purpose of making the locking-plate overlap the member 11, and this adjustment of the locking-plate turns the elongated eye for its major axis to lie at right angles to the corresponding axis of the elongated head 15 on the stud, whereby the locking-plate effectually prevents displacement of the stud and securely holds the fastener members in their closed overlapping positions.

It will be seen that the locking-plate 18, formed with the elongated eye and the headed stud 14, constitute a pair of coöperating locking members for the strips 10 and 11. In certain of the claims, therefore, I shall designate these elements, broadly, as an "elongated eye member" and a "stud member," respectively.

The locking-plate may be loosely connected to the fastener member 11 in any suitable way, so as to turn freely thereon, and as one means for connecting said member 11 and the locking-plate I have shown the pivotal plate 20. This pivotal plate is fitted against the inner side of the member 11, while the eye-formed end of the locking-plate bears against the outside of said member, and this pivotal plate is united by oppositely-arranged studs or rivets 22 23, which pass loosely through the eye 17 of the member 11, the studs 22 23 being fastened securely to the plate 18 on opposite sides of the elongated eye therein. The pivotal plate 20 is also provided with an elongated eye 21, and said pivotal plate is fastened securely by the studs or rivets to the locking-plate in a position for the elongated eyes to lie in corresponding positions and to always remain in registration. It is to be observed that the eye 17 in the member 11 is of circular form and that the studs or rivets which connect the pivotal and locking plates are adapted to move freely in the circular eye, whereby the locking-plate may turn on the loose or pivotal connection with the member 11, so that it may assume a position at right angles thereto, as shown by Fig. 4, or it may be turned parallel with the member 11, as in Fig. 3.

Each member of the fastener has its opposite edge rounded or curved to minimize the liability of cutting the fabric within which the fastener may be secured. If desired, the members of the fastener may be inclosed within suitable sheaths of fabric or other material; but this is optional. The fastener has its members secured to the edges of a skirt-placket, within the hem thereof, in any suitable way, and the pivotal members of the fastener lie within the skirt, so that all the parts of the fastener except the locking-plate are concealed from view.

In using the fastener the locking-plate is turned to the position shown by Fig. 4, and the members are closed together to bring the edges of the placket in overlapping relation and to make the headed stud pass through the eyes 21, 17, and 19 of the plate 20, the member 11, and the plate 18, respectively, after which the locking-plate is turned parallel to the member 11, so as to turn its eye into a position to prevent accidental withdrawal of the headed stud from engagement therewith. To release the fastener, it is necessary to turn the locking-plate back to the position shown by Fig. 4, thereby freeing the stud 14 and enabling it to be readily passed through the eyes of the member and the two plates. It is evident that the lock may be easily and quickly manipulated to hold the fastener members in their parallel position or to release the stud and permit the members 10 11 to be opened, so that the skirt may be easily applied or removed.

The locking device occupies a compact relation to the fastener when the latter is closed, and the upper part of the fastener may be concealed by a belt or by the waist of the dress.

The device is simple in construction, it consists of few parts, so that it is cheaply manufactured, and it may be applied with ease and facility to a skirt.

Changes within the scope of the appended claims may be made in the form and proportion of some of the parts while their essential features are retained and the spirit of the invention is embodied. Hence I do not desire to be limited to the precise form of all the parts, as shown, reserving the right to vary therefrom.

The preferred means for connecting the pivotal and locking plates is shown in the drawings in the form of a ring 25, from which extends the studs. This ring is equal in thickness to the member 11 and is of a size to turn freely therein. The ring is thus adapted to lie in the plane of the member 11 and between the locking-plate and the pivotal plate. The studs serve to unite the ring firmly to the pivotal plate and to the locking-plate. It is evident, however, that the ring may be omitted and that rivets may pass through the eye of the member 11 and be secured at their opposite ends to the pivotal plate and to the locking-plate. It is evident, further, that while I have illustrated and described the fastening device as comprehending a fixed stud and a rotary locking-plate having an elongated slot or eye an inversion of this arrangement might be employed without departing from the spirit of the invention—that is to say, one of the fastener members might be provided with an elongated eye and the other member with a rotary locking-plate having a stud movable therewith and arranged to have its head turned at right angles to the major axis of the eye, such inversion of the elements constituting mere mechanical adaptation or modification of the subject-matter of the invention.

Having thus described the invention, what I claim is—

1. A placket-fastener comprising a pair of strips connected at one end and a locking device for said strips consisting of an elongated eye member and a coöperating stud member, said members being disposed in axial alinement and one of said members having independent axial movement, the alinement of the members permitting such independent axial movement for the purpose of disposing the members in locked or unlocked positions without necessitating relative movement of the strips.

2. A placket-fastener comprising a pair of strips connected at one end and a locking device for said strips comprising an eye member having an elongated eye, and a stud member having an elongated head, said members having their axes alined, and a rotary locking-plate constituting a part of one member and coaxial with both members to permit the elongated head of the stud member to assume a position at right angles to the elongated eye of the eye member while the strips remain relatively stationary.

3. A placket-fastener comprising pivoted members, a stud on one member, and a locking-plate loosely connected to the other member to turn freely thereon with its axis in line with the axis of the stud and provided with an eye adapted to receive the stud and to retain the latter in engagement with said locking-plate when it is turned parallel to the members, substantially as described.

4. A placket-fastener comprising pivoted members, one of which is provided with a circular eye and the other of which is provided with a stud having an elongated head, a locking-plate having an elongated eye, and a pivotal plate mounted to rotate within the circular eye of one of the members and having an elongated eye coincident with the elongated eye of the locking-plate, said pivotal plate being fastened to the locking-plate to constitute a journal therefor.

5. A placket-fastener comprising pivoted members, one of which is provided with a circular eye, a stud fast with the other member and having an elongated head, a locking-plate having an elongated eye whose major axis is smaller than the diameter of said circular eye, a pivotal plate applied on the opposite side of the eye-formed member from the locking-plate, and fasteners connecting the pivotal and locking plates and passing through the eye of one member, substantially as described.

In testimony that I claim the foregoing as my own I have hereto affixed my signature in the presence of two witnesses.

FRED A. CHELLIS.

Witnesses:
THOMAS H. GATELY, Jr.,
CHARLES E. PERKINS.